(12) United States Patent
Matsushita et al.

(10) Patent No.: US 8,152,512 B2  
(45) Date of Patent: Apr. 10, 2012

(54) IMPRINTING APPARATUS

(75) Inventors: Takeshi Matsushita, Tokyo (JP); Tomonori Katano, Nagano (JP); Shinji Uchida, Nagano (JP)

(73) Assignee: Fuji Electric Co., Ltd. (JP)

(*) Notice: Subject to any disclaimer, the term of this patent is extended or adjusted under 35 U.S.C. 154(b) by 161 days.

(21) Appl. No.: 12/645,083

(22) Filed: Dec. 22, 2009

(65) Prior Publication Data
US 2010/0189834 A1   Jul. 29, 2010

(30) Foreign Application Priority Data
Dec. 22, 2008 (JP) ................... 2008-325921

(51) Int. Cl.
*B29C 59/00* (2006.01)
(52) U.S. Cl. ........ 425/385; 425/810; 264/293; 264/1.33
(58) Field of Classification Search .................. 425/385, 425/810; 264/293, 1.33
See application file for complete search history.

(56) References Cited

U.S. PATENT DOCUMENTS

| | | | | |
|---|---|---|---|---|
| 4,362,492 A * | 12/1982 | Prusak | ............ | 425/309 |
| 4,447,381 A * | 5/1984 | Matey | ............ | 264/107 |
| 5,772,905 A | 6/1998 | Chou | | |
| 2005/0158163 A1* | 7/2005 | Harper et al. | ............ | 414/788.1 |
| 2005/0236738 A1* | 10/2005 | Harper | ............ | 264/293 |
| 2005/0284320 A1 | 12/2005 | Sakuarai et al. | | |
| 2008/0029931 A1 | 2/2008 | Tada et al. | | |

FOREIGN PATENT DOCUMENTS

JP   2005-108351 A   4/2005
JP   2008-012859 A   1/2008

* cited by examiner

*Primary Examiner* — Maria Veronica Ewald
(74) *Attorney, Agent, or Firm* — Rossi, Kimms & McDowell LLP

(57) ABSTRACT

The present invention provides an imprinting apparatus in which stampers, after a transfer step, can be readily and quickly detached from a substrate and an atmosphere in the imprinting apparatus is kept clean. The imprinting device has an ejecting mechanism for separating a recording medium substrate from a first stamper and a second stamper the ejecting mechanism being formed including a sleeve and a coil spring that are movably provided in a movable die base with an exhausting duct, and also including a sleeve and a coil spring that are movably provided in a fixed die base with an exhausting duct.

2 Claims, 7 Drawing Sheets

IMPRINTING APPARATUS

CROSS-REFERENCE TO RELATED APPLICATION

This application is based on, and claims priority to, Japanese Patent Application No. 2008-325921, filed on Dec. 22, 2008 contents of which are incorporated herein by reference.

BACKGROUND

The present invention relates to an imprinting apparatus for transferring an uneven pattern with protrusions and recesses of a stamper to be replicated on a recording medium substrate, such as a magnetic recording medium, by pressing the stamper onto a resist layer or a polymer layer applied on the substrate.

With increasing recording density of a magnetic recording medium for use in a hard disk drive, micro machining technologies have been proposed including electron beam lithography, focused ion beam lithography, and nano imprinting lithography for manufacturing discrete track media and bit patterned media. In the nano imprinting lithography technology, as shown in U.S. Pat. No. 5,772,905, a stamper having a pattern of protrusions and recesses formed thereon is pressed onto a resist surface of a recording medium substrate to perform pattern transfer. This technology can carry out pattern transfer of a full surface of a magnetic recording medium at one time of pressing with a stamper to achieve high throughput production of magnetic recording media.

The nano imprinting lithography technology includes a 2P method, a hot embossing method, and a high pressure pressing method. The high pressure pressing method, which can perform pattern transfer with high precision and with high throughput, uses an imprinting apparatus as shown in Japanese Unexamined Patent Application Publication No. 2005-108351.

The imprinting apparatus comprises principal components of a press bottom plate with a surface for mounting a substrate having a resist film thereon and a press top board having a stamper with a disk shape and disposed allowing movement to approach and depart relative to the press bottom plate. The stamper has a pattern of protrusions and recesses in the central area thereof representing recording data.

In this structure, when the stamper is pressed onto a resist layer or a polymer layer formed on a recording surface of a magnetic recording medium substrate, the resist layer flows along the pattern of the stamper to transfer the pattern of protrusions and recesses on the recording surface of the substrate.

When a release agent is applied on a surface of the stamper, the release agent is gradually peeled off due to repeated transfer processes causing regional variation in the releasing effect. In this situation, the resist layer has a regional variation in a film thickness thereof and a quantity of resist flowing to the pattern is microscopically different from place to place. For this reason, an adhesive force between a recording surface and a stamper may differ from an adhesive force between another recording surface and another stamper. As a result, in the process of releasing the substrate from the stampers, the substrate is apt to be hardly released from the stamper in the side of the larger adhesive force, and the positions of holding the substrate are unstable in the die in the movable side and the die in the fixed side. As a consequence, when the substrate after the transfer process is taken out by means of a handler of a transporting robot, for example, the handler must have a rather complicated structure because the handler needs to cope with a plurality of positions for taking out the substrate. If the substrate has adhered to the upper stamper, it may falls down and be damaged. Regarding this problem, it is generally desired to hold the substrate always on the lower side die.

In view of the requirement, Japanese Unexamined Patent Application Publication No. 2008-012859 has proposed an imprinting device provided with a release pin for releasing the stamper from a recording surface of a magnetic recording medium substrate after the transfer process. The release pin having a releasing portion is disposed in a center holes of the substrate and of one of the stamper and moved in the radial direction of the stamper and also moved in the vertical direction by a driving device. One of the two stampers made of quarts is applied with optically curing resin on one side of the stamper. The magnetic recording medium substrate is also applied with optically curing resin on one side thereof.

In this structure, the magnetic recording medium substrate is disposed between the two stampers each supported by an upper plate and a lower plate and pressed. Then, ultraviolet light beam is irradiated in this pressed condition. After the optically curing resin is cured, the upper and lower plates are brought apart from each other allowing the magnetic recording medium substrate having the patterns of the stampers transferred on both surfaces of the substrate to be extracted. In this process, the releasing portion of the release pin mentioned above is brought into contact with beveling parts of the stamper and of the substrate and moved upwards. By this operation, one of the stampers is peeled off from one of the recording surfaces of the substrate. The releasing portion of the release pin is then moved downwards and brought into contact with beveling parts of the other stamper and of the substrate and moved yet downwards. Thus, the other stamper is bent and released from the other recording surface of the substrate, producing a magnetic recording medium substrate with the patterns transferred on the both surfaces thereof.

Particles may be generated in the imprinting device at a bearing part between an upper plate or a lower plate and a guide member for guiding the upper plate or the lower plate, the guide member being provided in a lifting mechanism for the upper or lower plate. If the particles are floating and attached onto the pattern of protrusions and recesses of the stamper representing recording data, the pattern defects due to the particles may be transferred onto the recording surface of the substrate. Hence, the atmosphere in the imprinting device must be kept clean.

The imprinting device disclosed in Japanese Unexamined Patent Application Publication No. 2008-012859 Patent Document 3 is provided with a release means for releasing the stamper from the recording surface of the magnetic recording medium substrate. This structure is significantly effective in view of mass production of magnetic recording medium substrates.

It is not easy, however, to control precisely and quickly the operation of a driving device so that the tip of the releasing portion of the release pin is brought into contact with the beveling parts of the relatively thin stamper and the substrate. This situation inhibits high throughput production of magnetic recording media using the imprinting device.

In addition, there exists no imprinting device that has a construction considering cleanliness in the device.

In view of the above problems, it would be desirable to provide an imprinting apparatus for transferring a pattern of protrusions and recesses on a nano imprinting stamper to a recording medium substrate of a magnetic recording medium or the like by pressing the stamper onto a resist layer or a polymer layer applied on the substrate, wherein the substrate, after the transfer process, can be removed from the stamper easily and quickly, and further, a clean atmosphere in the imprinting apparatus can be kept.

SUMMARY OF THE INVENTION

The invention provides an imprinting apparatus for transferring a pattern of protrusions and recesses on a nano imprinting stamper to a recording medium substrate of a magnetic recording medium or the like by pressing the stamper onto a resist layer or a polymer layer applied on the substrate, wherein the substrate, after the transfer process, can be removed from the stamper easily and quickly, and further, a clean atmosphere in the imprinting apparatus can be kept.

In order to accomplish the above object, an imprinting apparatus according to the invention comprises: a fixed die base provided with a fixed-side stamper holder having a stamper-holding portion for detachably holding an outer peripheral region of a first stamper that has a pattern of protrusions and recesses to be transferred onto a first surface of a recording medium substrate, with a hollow disk shape and also provided with a first pressing die on which the first stamper is mounted; a movable die base disposed allowing approaching to or separating from the fixed die base, the movable die base being provided with a movable-side stamper holder having a stamper-holding portion for detachably holding an outer peripheral region of a second stamper that has a pattern of protrusions and recesses to be transferred onto a second surface of the recording medium, and also provided with a second pressing die that is disposed opposing the first pressing die and mounts, detachably through the second stamper, the recording medium substrate with an outer diameter smaller than that of the second stamper, the pattern of protrusions and recesses of the second stamper being transferred onto the recording medium substrate; a first sleeve disposed movably in an inner circumferential surface of the first pressing die on the fixed die base and having an end plane that comes into contact with inner periphery of the first surface of the recording medium substrate; a first enforcing means for enforcing an end plane of the first sleeve in an direction approaching the first surface of the recording medium substrate; a second sleeve disposed movably in an inner circumferential surface of the second pressing die on the movable die base and having an end plane that comes into contact with inner periphery of the second surface of the recording medium substrate; a second enforcing means for enforcing an end plane of the second sleeve in a direction approaching the second surface of the recording medium substrate; wherein when the movable die base approaches the fixed die base, the end plane of the first sleeve comes in contact with inner periphery of the first surface of the recording medium substrate opposing to enforcement of the first enforcing means, and the end plane of the second sleeve comes in contact with inner periphery of the second surface of the recording medium substrate opposing to enforcement of the second enforcing means; and when the movable die base separates from the fixed die base, accompanying the separating movement of the movable die base, the end plane of the first sleeve is moved to separate the recording medium substrate from the first stamper by enforcement of the first enforcing means, and the end plane of the second sleeve is moved to separate the recording medium substrate from the second stamper by enforcement of the second enforcing means.

In the imprinting apparatus of the invention, with separating operation of the movable die base from the fixed die base, end planes of the first sleeve and the second sleeve are moved by the enforcement of the first enforcing means and the second enforcing means so as to separate the recording medium substrate from the first stamper and from the second stamper. Therefore, the substrate, after the transfer process, is removed from the stampers easily and quickly.

In the imprinting apparatus according to the invention, a first exhausting duct formed within the fixed die base and communicating to a sliding place at which the first enforcing means and an end portion of the first sleeve are disposed, communicates to an outer circumference of a first connection pin that connects the collet pin and the first sleeve; and a second exhausting duct formed within the movable die base and communicating to a sliding place at which the second enforcing means and an end portion of the second sleeve are disposed, communicates to an inner hole of a second connection pin that connects the collet and the second sleeve. Therefore, the atmosphere in the imprinting apparatus can be kept clean.

BRIEF DESCRIPTION OF THE DRAWINGS

The invention will be described with reference to certain preferred embodiments thereof along with the accompanying drawings, wherein.

DETAILED DESCRIPTION OF THE PREFERRED EMBODIMENTS

Figure 2:
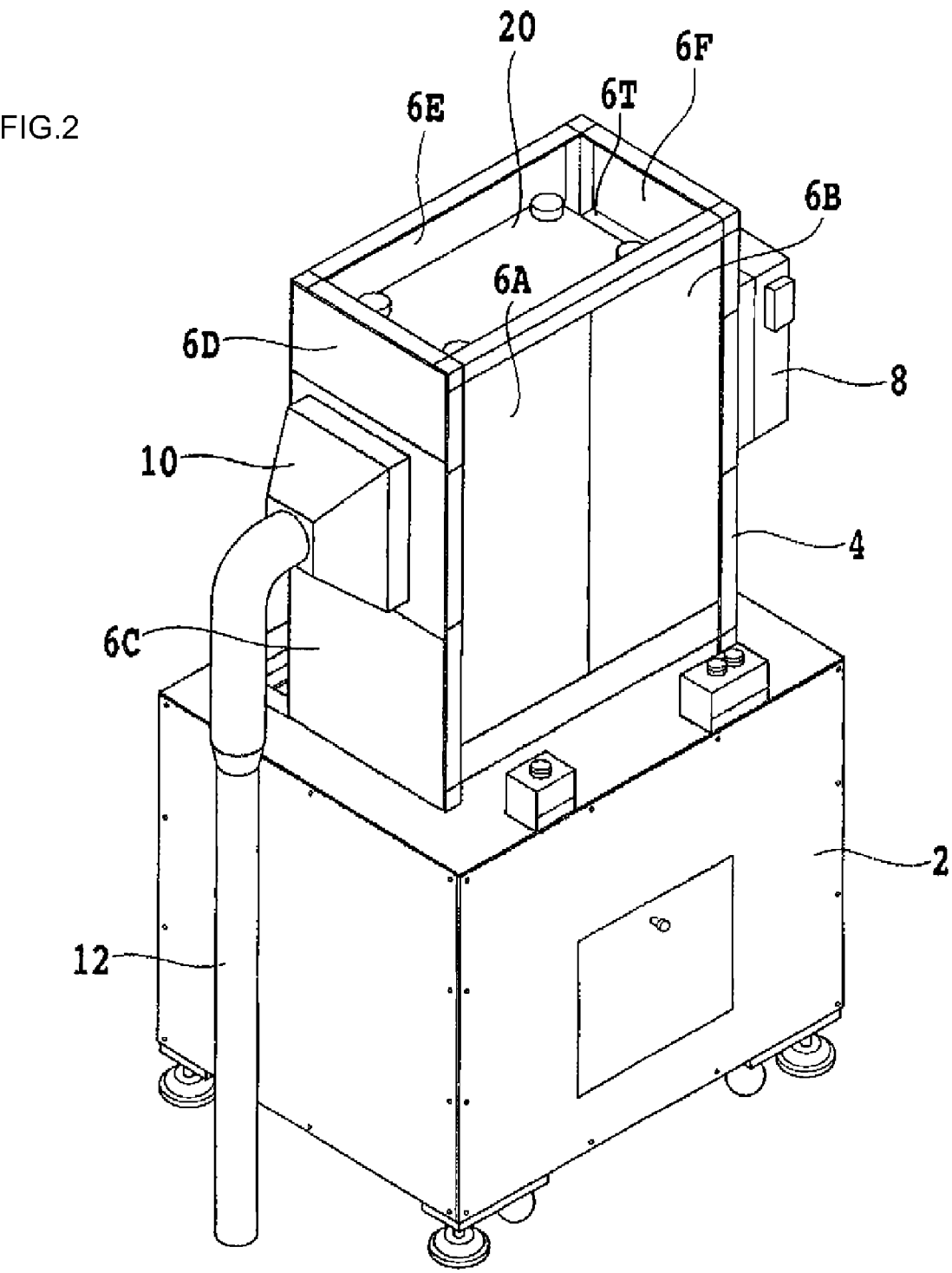
FIG. 2 is a perspective view showing an external view of an essential part of an example of an imprinting apparatus according to the invention.

FIG. 2 is an external view of an example of an imprinting apparatus according to the present invention. Referring to FIG. 2, the imprinting apparatus includes principal components of a base box 2 to support a housing described afterwards, a ventilation unit 8 fixed on one side face of the housing disposed on the base box 2, an exhaust duct fitting structure 10 fixed on the other side face of the housing opposite to the ventilation unit 8, and a press machining device (FIG. 3) installed in the space for installing the press machining device in the housing.

The housing 4 forms a space 4A for installing the press machining device, and comprises door leaves 6A and 6B supported allowing opening and closing, and forming a front plane of the housing, a side plate 6F forming a side plane of the housing, side plates 6C and 6D forming the other side plane of the housing, a rear plate 6E opposing the door leaves 6A and 6B, and a top plate 6T allowing externally opening.

The ventilation unit 8 is fixed on the side plate 6F. The ventilation passage (not shown in the figure), within which a fan blower of the ventilation unit 8 is installed, communicates to the space 4A for installing the press machining device. The exhaust duct fitting structure 10 is fixed on the side plate 6D. Inside of the exhaust duct fitting structure 10 is communicating to the space 4A for installing the press machining device. An end of an exhaust pipe 12 is connected to the exhaust duct fitting structure 10.

The door leaves 6A and 6B are provided so as to restrict the air ventilation in the space between the pedestal 16 and the fixed block 20 thereby reducing penetration of particles from outside the device.

By means of the ventilation unit 8 and the exhaust pipe 12, air flow is formed uniform in the press machining device and the particles generated in the apparatus are exhausted not to remain within the apparatus.

The ventilation unit 8 is consistently operated to prevent the external air from entering into the space 4A for installing the press machining device. The ventilation rate of the ventilation unit 8 is controlled so as to maintain the pressure in the space 4A for installing the press machining device larger than the atmospheric pressure, in opposition to the continuously exhausting flow through the exhausting pipe 12 and other exhausting passes which will be described afterwards.

Figure 1:
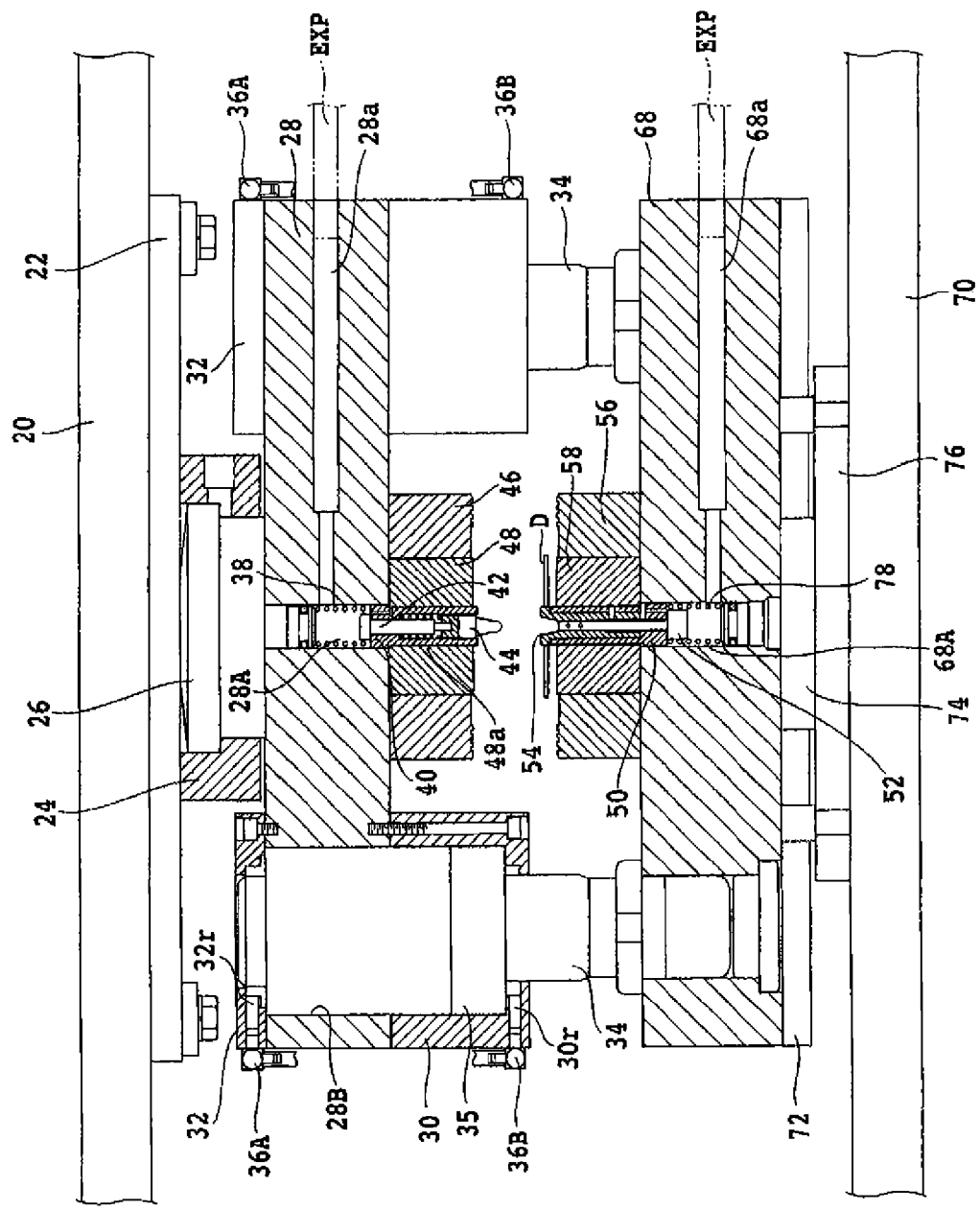
FIG. 1 is a sectional view of an essential part of an example of an imprinting apparatus according to the invention.
Figure 3:
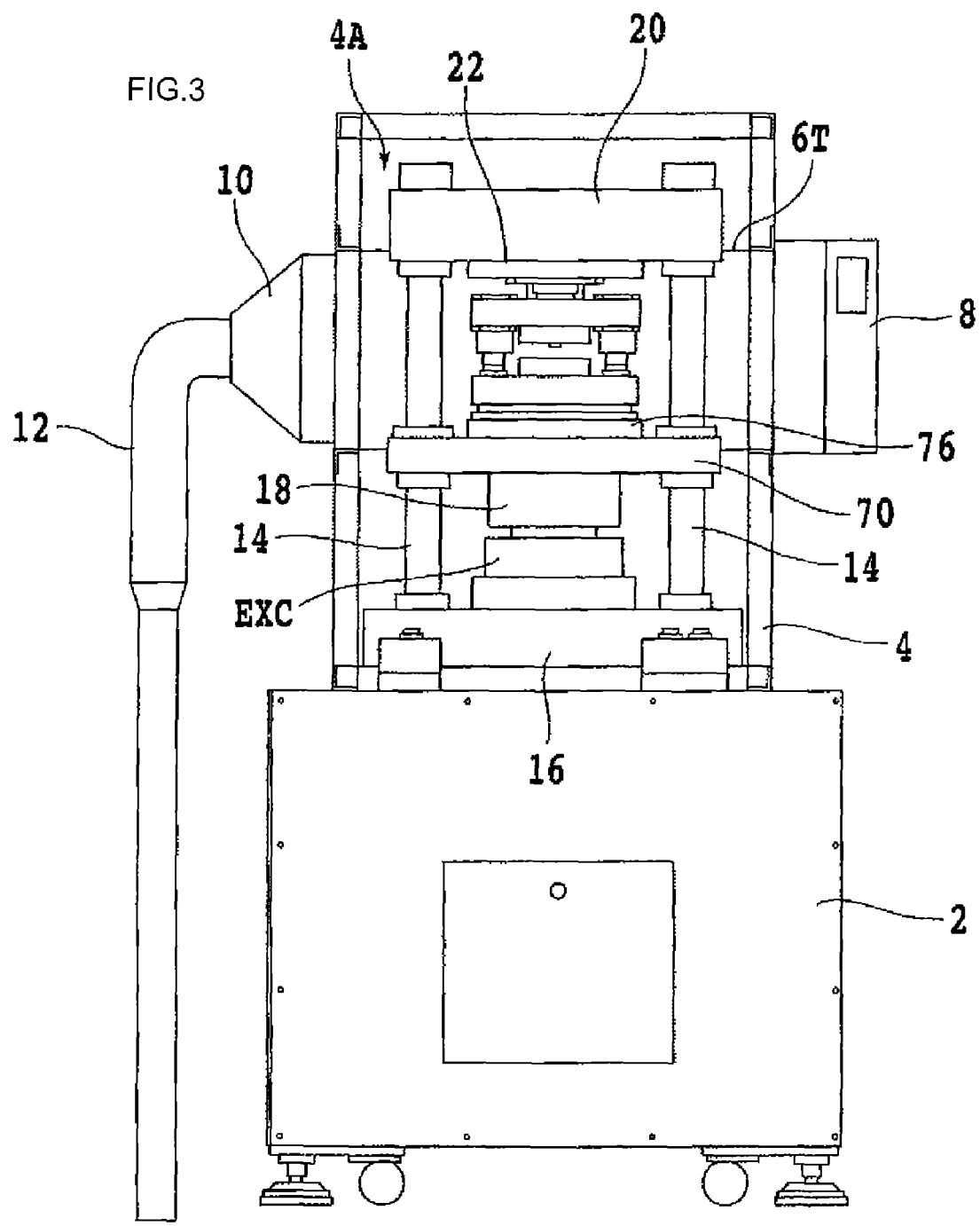
FIG. 3 is a front view showing the example of FIG. 2 in the state with door leaves opened.

The press machining device comprises in the space 4A for installing a press machining device, as shown in FIG. 1 and FIG. 3, a pedestal 16 fixed on the upper surface of the base box 2, a movable block 18 connected to a rod of a driving cylinder (not shown in the figure) passing through an opening in the pedestal 16 and vertically driving a movable plate 70 which will be described later, a fixed block 20 and four guide members 14 that are supported by the pedestal 16 at one end thereof and by the fixed block 20 at the other end, and guide the movable plate 70 keeping the flat surface of the movable plate 70 approximately parallel to the flat surface of the fixed block 20.

Both surfaces of a recording medium substrate D (FIG. 4), on which patterns on a stamper STA and a stamper STB are transferred by the press machining device, have resist layers formed as recording surfaces of a magnetic recording medium. The recording medium substrate D has a hole di in the center thereof for coupling with a collet which will be described later.

The stamper STA and the stamper STB with a disk shape (FIG. 4) have a diameter larger than the outer diameter of the recording medium substrate D and are made of a silicon substrate or a nickel substrate having a thickness in the range of 0.1 to 1.0 mm, for example. Each of the stamper STA and the stamper STB has a pattern of protrusions and recesses representing recording data on one surface around a center hole of the stamper.

The patterns of protrusions and recesses on the stamper STA and the stamper STB are formed so that the protrusions correspond to recesses of patterns on the resist layer formed on the both surfaces of the recording medium substrate D.

The base box 2 contains a hydraulic circuit (not shown in the figure) for controlling the operation of the driving cylinder.

A cover member EXC is provided, between the movable plate 70 and the pedestal 16, for surrounding the rod of the driving cylinder projecting out from the opening in the pedestal 16.

There are provided between the movable plate 70 fixed on the movable block 18 and the fixed block 20, as shown in FIG. 1, principal components of a movable die base 68, an attachment plate 76 that connects the movable die base 68 to the movable plate 70 through a first receiving plate 72 and a second receiving plate 74, a fixed die base 28, and an attachment plate 22 that connects the fixed die base 28 to the fixed block 20.

The attachment plate 76 is fixed to the movable plate 70 with a plurality of small screws. The attachment plate 76 is connected to the first receiving plate 72 and the second receiving plate 74 with appropriate fastening members (not shown in the figures), the first and second receiving plates being fixed to the movable die base 68. The second receiving plate 74 is thicker than the first receiving plate 72. Hence, a compressing force is transmitted from the movable block 18 through the movable plate 70, the attachment plate 76, and the movable die base 68, and concentrated onto a substrate pressing die 58 which will be described afterwards.

Inside the movable die base 68 formed are a spring-containing room 68A in which a coil spring 78 of an ejecting mechanism (which will be described later) is disposed through a spring holder, and an exhausting duct 68a for communicating the spring containing room 68A to an exhausting tube EXP. The exhausting duct 68a extends approximately parallel to the die mounting plane of the movable die base 68.

The movable die base 68 is provided with guide shafts 34 at four corners thereof in the configuration approximately perpendicular to the die mounting surface of the movable die base 68. The lower end of each guide shaft 34 is screwed into an attachment hole of the movable die base 68 and fastened with a nut. The upper end of each guide shaft 34 is slidably coupled with a bearing part 35 provided at the fixed die base 28 which will be described later.

On the central region of the die mounting surface of the movable die base 68 opposing the fixed die base 28, a stamper holder 56 with a cylindrical shape and a substrate pressing die 58 disposed inside the stamper holder 56 are provided. The stamper holder 56 has an upper surface region for holding the outer peripheral region of the stamper STB. The holding surface region with a hollow disk shape has a plurality of concentric ring shaped grooves communicating to a suction part (not shown in the figures) of a vacuum pump. A plurality of small holes are formed in each groove, which attract and hold the peripheral region of the stamper STB on the holding surface region of the stamper holder in the operation period of the vacuum pump.

Figure 4:
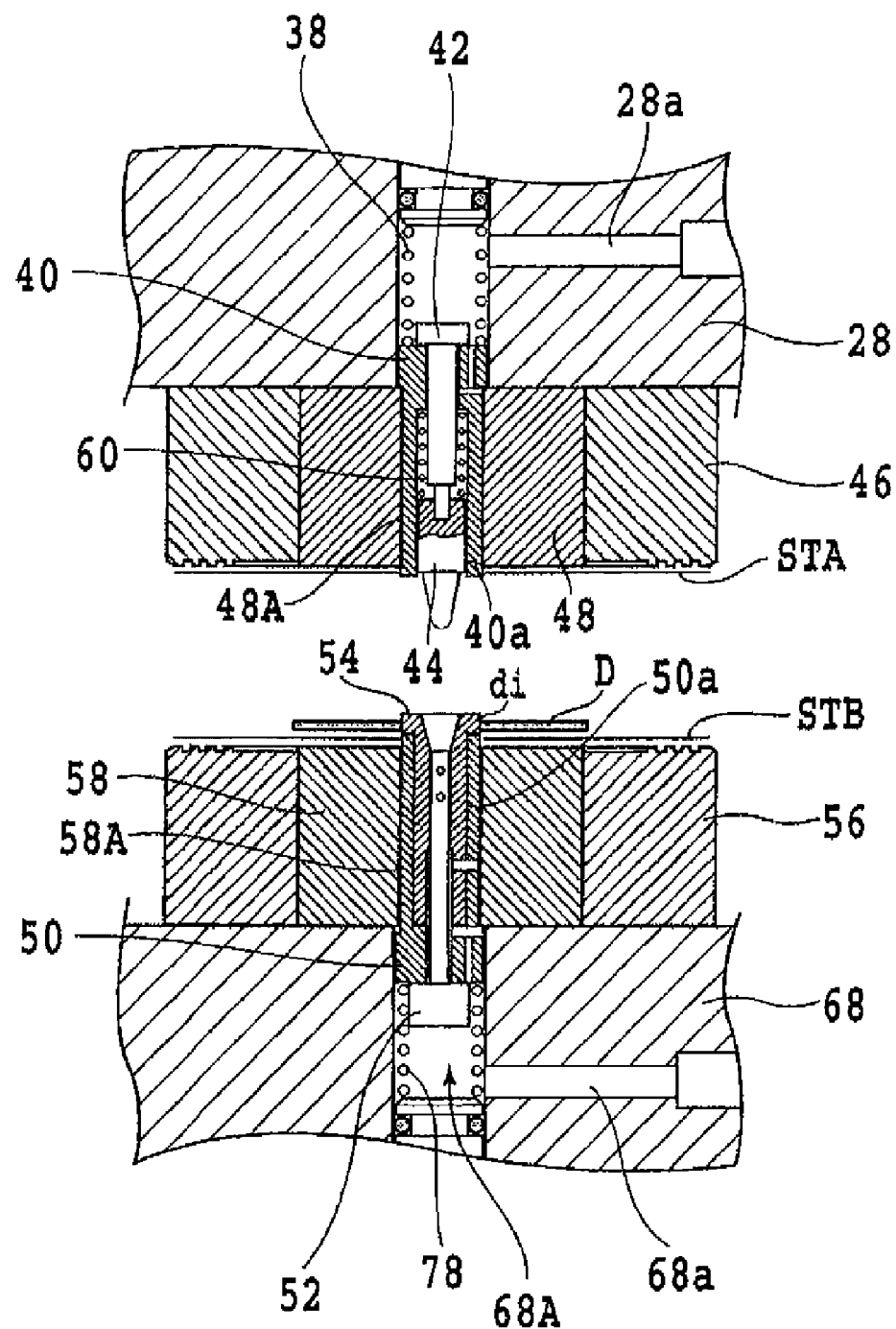
FIG. 4 is a partial enlarged sectional view of the example of FIG. 1.

The substrate pressing die 58 has, as shown in FIG. 4, a hole 58A in which a sleeve 50 with a cylindrical shape is slidably inserted. The hole 58A communicates to the spring containing room 68A. A diameter of the hole 58A is smaller than that of the spring containing room 68A. This configuration limits upward movement of the sleeve 50 when the step part of the sleeve 50 enforced by the coil spring 78 comes into contact with the periphery of the opening end of the hole 58A.

The sleeve 50 has a hole 50a therein for coupling with a collet 54 that detachably holds the recording medium substrate D. An outer diameter of the tip of the sleeve 50 is equal to or smaller than the inner diameter of the stamper STB.

The collet 54 is connected to the sleeve 50 by screwing a male screw portion of a connection pin 52 placed through the collet 54 into a female screw portion on the inner peripheral part of the collet 54. The collet 54 has a plurality of elastically deformable tabs along the circumferential direction. Each of the four tabs equally divided by slitting along the circumferential direction has a property of a leaf spring. The middle portion of each tab is relatively thin. A portion of the collet 54 lower than the middle portion has the female screw on its inner peripheral part as mentioned above.

In the state of the collet 54 other than holding the recording medium substrate D, the minimum outer peripheral diameter of the tapered tip portion formed of all tabs of the collet 54 is a little smaller than the inner peripheral diameter of the recording medium substrate D. When a collet pin 44, which will be described later, is engaged with the tabs, the tabs elastically deforms and expands radially outwards, to hold the inner peripheral part of the recording medium substrate D.

Thus, an ejecting mechanism for separating the recording medium substrate D from the stamper STB is formed including the sleeve 50 and the coil spring 78.

The connection pin 52 with a hollow cylindrical shape has, inside thereof, an air passage with a diameter of about 2 mm along the center line of the connection pin. Two holes approximately perpendicular to the air passage are formed in the connection pin 52. The two holes are communicating to the air passage.

As shown in FIG. 1, the fixed die base 28, which is linked to the fixed block 20 through the attachment plate 22, has a shank pin 26, which is coupled with a shank cover 24 fixed to the fixed block 20, in the center of the surface of the fixed die base 28 opposing the attachment plate 22. The end part of the shank pin 26 for coupling with the attachment plate 22 has a spherical surface.

The fixed die base 28 has holes 28B to which bearing parts 35 are disposed corresponding to guide shafts 34. At one open end of the hole 28B, a guide cover 30 is attached. The guide cover 30 is fixed to one surface of the fixed die base 28 with bolts. The guide cover 30 has a hole through which the guide shaft 34 coupling with the bearing part 35 passes. The guide cover 30 has an exhausting passage 30r, one end of which opens to the inner periphery of the hole of the guide cover 30. At the other end of the exhausting passage 30r, a vent valve 36B of a screw connection type is provided. The vent valve 36B connects through an exhausting tube to a vacuum pump (not shown in the figures). In an operation period of the vacuum pump, the particles generated at the bearing part 35 are forcedly exhausted through the exhausting passage 30r and the vent valve 36B.

At the other opening end of the hole 28B, a guide cover 32 is provided covering the bearing part 35 and an end of the guide shaft 34. The guide cover 32 is fixed on the other (upper) surface of the fixed die base 28 with bolts. At a place adjacent to the guide shaft 34 inside the guide cover 32, an end of an exhausting passage 32r opens. At the other end of the exhausting passage 32r, a vent valve 36A of a screw connection type is provided. The vent valve 36A connects through an exhausting tube to the vacuum pump (not shown in the figures). In an operation period of the vacuum pump, the particles generated at the bearing part 35 are forcedly exhausted through the exhausting passage 32r and the vent valve 36A.

Inside the fixed die base 28 formed are a spring-containing room 28A in which a coil spring 38 of an ejecting mechanism (which will be described later) is disposed through a spring holder, and an exhausting duct 28a for communicating the spring containing room 28a to an exhausting tube EXP. The exhausting duct 28a extends approximately parallel to the die mounting plane of the fixed die base 28.

On the fixed die base 28 provided are a stamper holder 46 with a hollow cylindrical shape and a substrate pressing die 48 with a hollow cylindrical shape disposed inside the stamper holder 46, respectively opposing the stamper holder 56 and the substrate pressing die 58.

As shown in FIG. 4, the stamper holder 46 has a lower surface region for holding the outer peripheral region of the stamper STA. The holding surface region with a hollow disk shape has a plurality of concentric ring-shaped grooves communicating to a suction part (not shown in the figures) of a vacuum pump. A plurality of small holes are formed in each groove, which attract and hold the peripheral region of the stamper STA onto the holding surface region of the stamper holder in the operation period of the vacuum pump.

The substrate pressing die 48 has a hole 48A in which a sleeve 40 with a hollow cylindrical shape is slidably inserted. The hole 48A communicates to the spring containing room 28A. A diameter of the hole 48A is smaller than that of the spring containing room 28A. This configuration limits downward movement of the sleeve 40 when the step part of the sleeve 40 enforced by the coil spring 38 comes in contact with the periphery of the opening end of the hole 48A.

The sleeve 40 has a hole 40a inside thereof for coupling with a collet pin 44. A diameter of the tip of the sleeve 40 is equal to or smaller than the inner diameter of the stamper STA. The collet pin 44 makes the collet 54 described previously to work for holding the recording medium substrate D.

The collet pin 44 is connected to the connection pin 42 by screwing the tip of the connection pin 42 through the sleeve 40 and through the coil spring 60 into a female screw hole of the collet pin 44. The collet pin 44 has a tip part with a spherical shape to link with the inner periphery of the collet 54.

When the lower substrate pressing die 58 is pushed up, collet pin 44 engages with the collet 54 and pushes the tab portion thereof outwards to hold the recording medium surface substrate D. When the substrate pressing die 58 is further pushed upwards, the coil spring 60 contracts to relax the pressure exerted on the collet pin 44 and have the collet pin 44 to stay at the engaged state. Thus, the coil spring 60 is provided to hinder overloading on the inner periphery of the recording medium substrate D due to expansion of the outer diameter of the tab portion of the collet 54 which is caused by further insertion of the spherical part of the collet pin 44 into the inner peripheral portion of the collet 54. When the spherical part of the collet pin 44 links to the inner periphery of the collet 54, only the collet pin 44 is allowed to rise against enforcement of the spring 60.

In order to position the recording medium substrate D in the side of the stamper STB without failure in the state in which the substrate pressing die 58 is separated from the substrate pressing die 48, the three spring forces, the restoring force F1 of the coil spring 78, the restoring force F2 of the coil spring 38, and the restoring force of the coil spring 60, need to be selected so as to satisfy the following formula (I).

$$F3<F1<F2<<<\text{pressing force F} \tag{1}$$

The relation $F1<F2$ is caused by the requirement, in order to position the recording medium substrate D in the side of the stamper STB without failure on the releasing process, that the restoring force of the coil spring 38, which is a releasing force in the side of the substrate pressing die 48, is larger than the restoring force of the coil spring 78, which is a releasing force of the substrate pressing die 58.

The relation $F3<F1$ is caused by the requirement, in order to expand only the tab portion of the collet 54 without falling into a state incapable of holding the substrate D due to excessive pushing down of the collet 54 over a predetermined position by the collet pin 44, that the restoring force of the coil spring 60 is smaller than the restoring force of the coil spring 78.

The relation $F3<F1$ is set in order to ensure attaching and detaching operation of the collet 54 in consideration of variation of the restoring forces of the coil spring 60 and the coil spring 78.

Thus, the spring force of the coil spring 38 is set larger than the spring forces of the coil springs 78 and 60.

If the variation of the restoring forces of the coil spring 60 and the coil spring 78 can be estimated little, the restoring forces of the coil spring 60 and the coil spring 78 can be set approximately equal.

In operation of this construction as shown in FIG. 4, in a state the substrate pressing die 58 is separated from the substrate pressing die 48, the vacuum pump mentioned above is brought into operation, to attract and hold the stamper STA and the stamper STB onto the stamper holder 46 and the stamper holder 56, respectively.

The inner peripheries of the stamper STA and the stamper STB are inserted into the tip of the sleeve 40 and the sleeve 50, respectively.

Then, the recording medium substrate D is put on the stamper STB. The inner periphery of the recording medium substrate D is inserted into the tip of the collet 54 and the substrate D is rest on the top end face of the sleeve 50.

Figure 5:
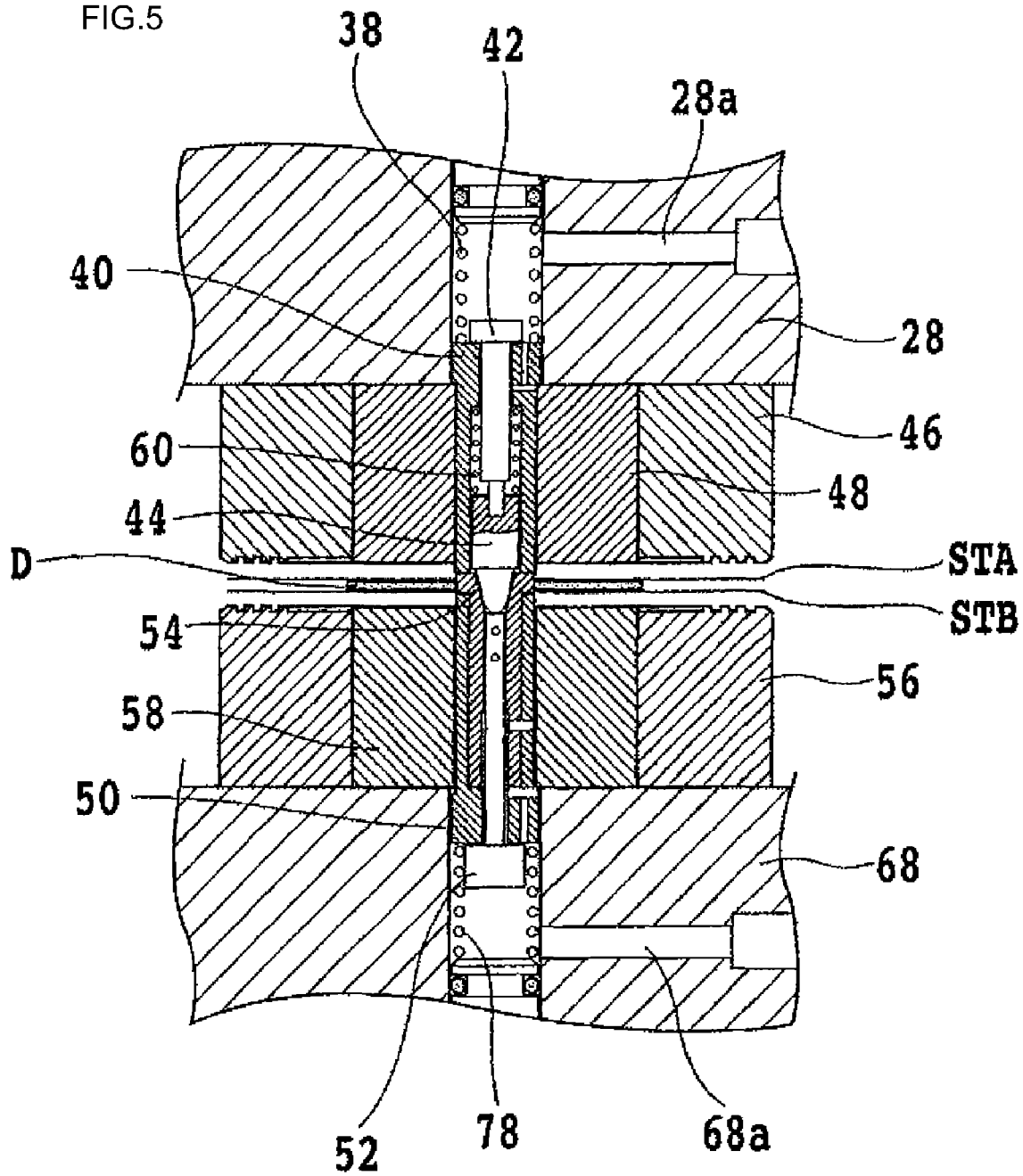
FIG. 5 is a sectional view for illustrating operation of the example of FIG. 1.

Subsequently, the driving cylinder mentioned previously is brought into operation, and as shown in FIG. 5, the substrate pressing die 58 approaches the substrate pressing die 48, thereby pushing the stampers STA and STB against the recording surfaces of the recording medium substrate D with a predetermined pressure F. The rising movement of the movable plate 70 continues until the substrate pressing die 58 reaches the substrate pressing die 48.

At this time, a pressure F (at least 100 MPA) acts on the stamper STA, the substrate D, and the stamper STB, and an adhering force of about 2 N (an experimental value) is generated.

When the inner peripheral portion of the collet 54 is coupled with the collet pin 44 in this adhered state, the tab portion of the collet 54 displaces outwards to directly chuck the inner periphery of the substrate D. Since the inner periphery of the substrate D is directly chucked, an amount of eccentricity of the inner periphery of the substrate D with respect to the inner peripheries of the stamper STA and the stamper STB is reduced in comparison with the conventional device disclosed in Patent Document 1 in which a positioning column (a positioning pin) is used for positioning an inner periphery of the substrate D with a predetermined clearance.

In the condition the pressure F is acting, since the pressure F is exceedingly greater than the enforcement of the coil spring 78, the coil spring 78 contracts and the sleeve 50 is moved downwards as shown in FIG. 5. Since the enforcement by the coil spring 38 is exceedingly smaller than the pressure F, the coil spring 38 contracts and the sleeve 40 is moved upwards.

Thus, the stampers STA and STB are pushed against the recording surfaces of the recording medium substrate D, and the patterns of the stampers STA and STB are transferred onto the recording planes of the recording medium substrate D.

When the substrate pressing die 58 is separated from the substrate pressing die 48 after the transfer process, the driving cylinder is brought into operation and the substrate pressing die 58 is made separated from the substrate pressing die 48. At this time, the restoring force of the coil spring 78 contracted under the pressure F acts on the sleeve 50 and raises the sleeve 50 and the collet 54, thereby pushing the inner periphery of the recording medium substrate D with the upper end plane of the sleeve 50. Hence, the recording medium substrate D is surely separated from the stamper STB.

At the same time, the sleeve 40 descends with the restoring force of the spring 38, thereby pushing down the inner peripheral part of the recording medium substrate D with the lower end face of the sleeve 40. Hence, the recording medium substrate D is surely separated from the stamper STA.

In this process, the substrate pressing die 58 is separated from the substrate pressing die 48, and simultaneously, the spherical portion of the collet pin 44 that has been coupled with the collet 54 is pulled out. As a consequence, the tabs that have been displaced outwards contracts by their spring property, creating a clearance between the inner periphery of the substrate D and the outer periphery of the tab portion of the collet 54. Therefore, the recording medium substrate D is readily attached and detached in a short time.

It is generally known that sliding dusts may be generated at the place where structural articles rub each other.

In the example of imprinting apparatus of the invention, the sliding dusts may be generated, for example, at the bearing part of the four guide members 14. The sliding dusts may be still generated at the bearing part 35 of the guide shafts 34.

In addition, when the shank pin 26 moves up and down, it may slide with the shank cover 24. Regarding these sliding places, the shank cover 24, the guide covers 30 and 32 are provided to prevent the generated sliding dusts from scattering in the apparatus by means of a locally exhausting structure.

Since the sleeve 50 is provided around the collet 54 and the sleeve 40 is provided around the collet pin 44, which produce moving or sliding parts, particles may be generated at these moving or sliding parts.

In order to prevent the particles generated at such moving parts from scattering in the apparatus, the exhausting duct 68*a* is provided and the air passage and the holes are formed in the connection pin 52. Therefore, the air Kb is ventilated through the inner periphery of the slits of the collet 54 as shown in the air passage shown in FIG. 6 and FIG. 7.

This construction allows the particles generated around the collet 54 to be exhausted out of the apparatus through the exhausting passage communicating to the exhausting duct 68*a*.

Figure 6:
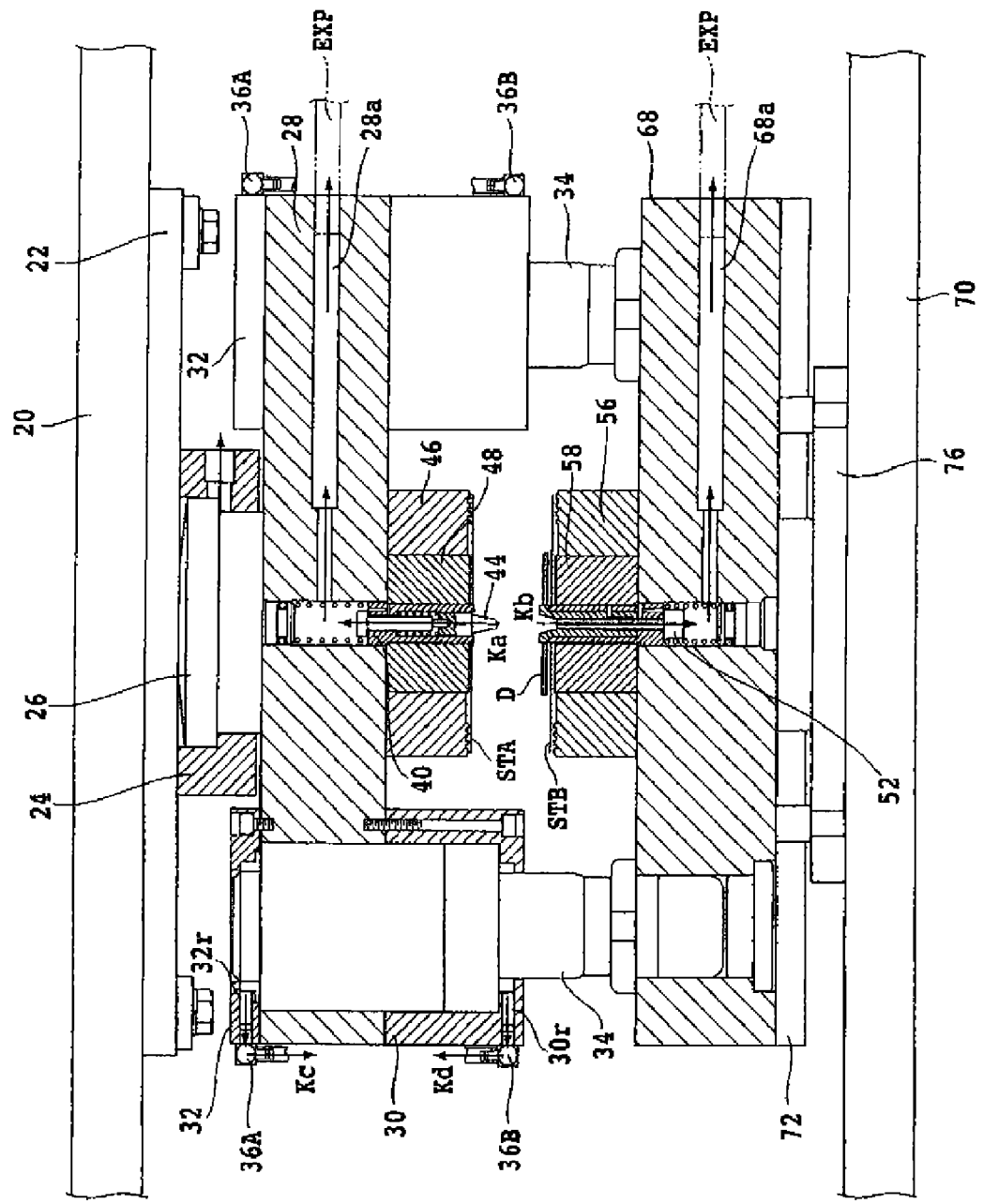
FIG. 6 is a partial sectional view for illustrating air passages in the example of FIG. 1.
Figure 7:
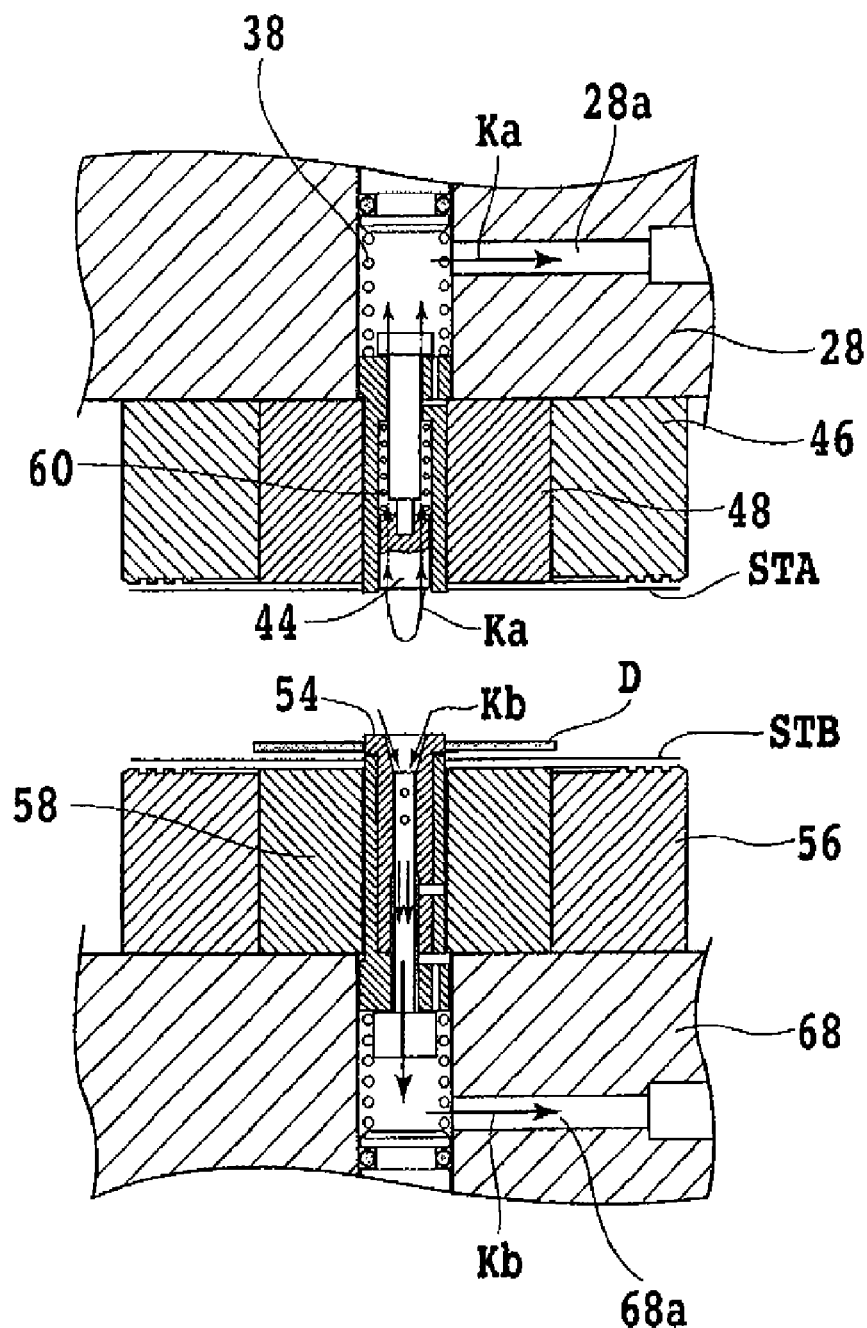
FIG. 7 is a partial enlarged view of the example of FIG. 6.

In the same way, the exhausting duct 28*a* is provided in the fixed die base 28 and a gap capable of enough ventilation is provided between the sleeve 40 and the connection pin 42. A passage for the air Ka reaches the collet pin 44 through this gap and through the space disposing the coil sparing 60 as shown in FIG. 6 and FIG. 7. An passage is also formed in the gap between the outer periphery of the collet pin 44 and the inner periphery of the sleeve 40 for ventilation towards outside of the apparatus through the exhausting duct 28*a* and an exhausting pipe (not shown in the figures) communicating the exhausting duct 28*a*.

In an example of an imprinting apparatus according to the present invention, ventilation is conducted directly from the place of particle generation, and further, air flow is controlled not to stay and not to form a vortex so as to flow in one direction uniformly inside the apparatus in which the dies are disposed, to prevent the particles from remaining in the apparatus. Therefore the particles that would adhere to the stamper STA and the stamper STB are reduced.

The invention has been described with reference to certain preferred embodiments thereof. It will be understood, however, that modifications and variations are possible within the scope of the appended claims.

What is claimed is:

1. An imprinting apparatus comprising:
    a fixed die base including a fixed-side stamper holder having a stamper-holding portion for detachably holding an outer peripheral region of a first stamper that has a pattern of protrusions and recesses to be transferred onto a first surface of a recording medium substrate with a hollow disk shape, and a first pressing die on which the first stamper is mounted;
    a movable die base movable to approach or separate from the fixed die base, the movable die base including a movable-side stamper holder having a stamper-holding portion for detachably holding an outer peripheral region of a second stamper that has a pattern of protrusions and recesses to be transferred onto a second surface of the recording medium, and a second pressing die that is disposed opposing the first pressing die and mounts, detachably through the second stamper, the recording medium substrate with an outer diameter smaller than that of the second stamper, the pattern of protrusions and recesses of the second stamper being transferred onto the recording medium substrate;

a first sleeve disposed movably in an inner circumferential surface of the first pressing die on the fixed die base and having an end plane that comes into contact with inner periphery of the first surface of the recording medium substrate;

a first enforcing means for enforcing an end plane of the first sleeve in a direction approaching the first surface of the recording medium substrate;

a second sleeve disposed movably in an inner circumferential surface of the second pressing die on the movable die base and having an end plane that comes into contact with inner periphery of the second surface of the recording medium substrate; and a second enforcing means for enforcing an end plane of the second sleeve in a direction approaching the second surface of the recording medium substrate;

wherein, when the movable die base approaches the fixed die base, the end plane of the first sleeve comes in contact with inner periphery of the first surface of the recording medium substrate opposing to enforcement of the first enforcing means, and the end plane of the second sleeve comes in contact with inner periphery of the second surface of the recording medium substrate opposing to enforcement of the second enforcing means;

wherein when the movable die base separates from the fixed die base, accompanying the separating movement of the movable die base, the end plane of the first sleeve is moved to separate the recording medium substrate from the first stamper by enforcement of the first enforcing means, and the end plane of the second sleeve is moved to separate the recording medium substrate from the second stamper by enforcement of the second enforcing means;

wherein the first sleeve is provided with a collet pin, and the second sleeve is provided with a collet with which a tip portion of the collet pin selectively couples;

wherein when the movable die base approaches the fixed die base, a coupled condition is established between the tip portion of the collet pin and the collet to hold the recording medium substrate by a tab portion of the collet, the tab portion being allowed to elastically deform; and wherein when the movable die base separates from the fixed die base, the tip portion of the collet pin and the collet are brought into an uncoupled condition to release the recording medium substrate from the tab portion;

the imprinting apparatus further comprising;

a first exhausting duct formed within the fixed die base and communicating to a sliding place at which the first enforcing means and an end portion of the first sleeve are disposed, communicates to an outer circumference of a first connection pin that connects the collet pin and the first sleeve; and a second exhausting duct formed within the movable die base and communicating to a sliding place at which the second enforcing means and an end portion of the second sleeve are disposed, communicates to an inner hole of a second connection pin that connects the collet and the second sleeve.

2. The imprinting apparatus according to claim 1, wherein a magnitude of enforcement of the first enforcing means is larger than a magnitude of enforcement of the second enforcing means.

* * * * *